Aug. 4, 1964 J. W. TAYLOR ETAL 3,143,143
SEQUENTIALLY OPERABLE VALVES
Filed Aug. 22, 1960
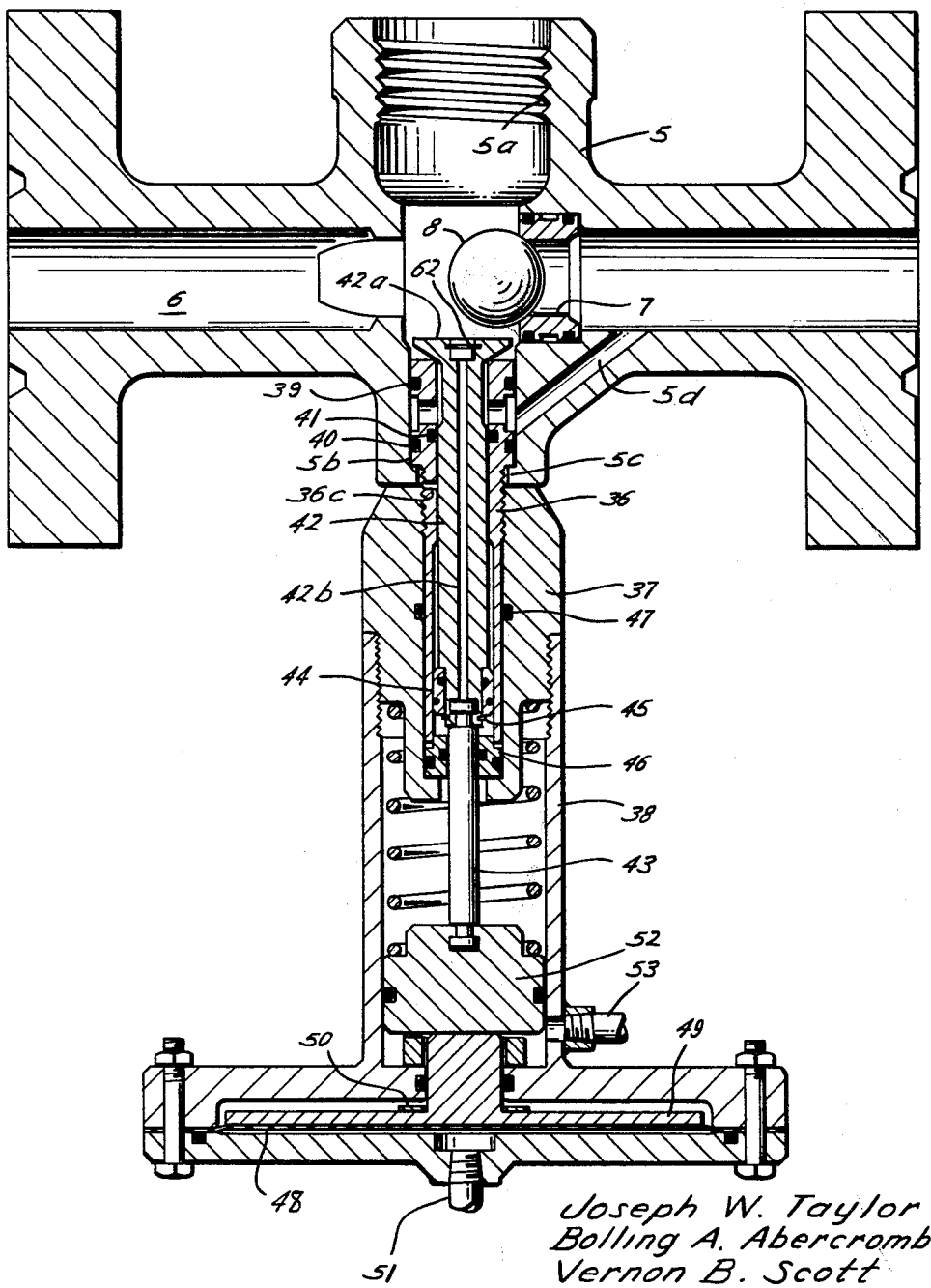
Joseph W. Taylor
Bolling A. Abercrombie
Vernon B. Scott
INVENTORS
BY Browning, Simms,
Dyer & Eickenroht
ATTORNEYS United States Patent Office 3,143,143
Patented Aug. 4, 1964

3,143,143
SEQUENTIALLY OPERABLE VALVES
Joseph W. Taylor, Bolling A. Abercrombie, and Vernon B. Scott, Longview, Tex., assignors to U.S. Industries, Inc., a corporation of Delaware
Filed Aug. 22, 1960, Ser. No. 50,953
1 Claim. (Cl. 137—629)

This invention relates to improvements in safety valves adapted to close upon occurrence of predetermined conditions and refers more particularly to improvements in the mechanism for opening such valves that employ a ball for the valve member that is held releasably at one side of the valve passageway and is released to engage a seat to close the valve.

This type of valve has proven to be very popular, particularly as a safety valve for use in high pressure lines, for example, the flow line of high pressure oil and gas wells. However, to open such a valve it is necessary to equalize the pressure across the valve member, at least to a substantial extent, before forcing the ball off its seat and back to its open position. When the valve member is forced off its seat before the pressure differential thereacross has been sufficiently reduced, the seating surfaces of the ball and the seat therefor are frequently damaged so that an improper sealing takes place on subsequent operation of the valve. Safety valves of the general class referred to above are shown in U.S. Patents 2,635,626 and 2,667,890.

It is an object to provide a ball-type safety valve in which a bypass is automatically opened during the opening operation and in which the effect of the line pressure in retarding opening movement of the opening mechanism is at least partially balanced out to facilitate the opening operation.

Another object is to provide a ball-type safety valve with an opening mechanism having an automatic bypass operable by a fluid motor capable of applying a limited force to the ball valve member to move it to open position which will move the ball only after a substantial reduction in the pressure differential across the ball valve member has taken place.

Another object is to provide for remote control of the opening operation of a ball-type safety valve.

Another object is to provide a ball-type safety valve with an automatic bypass opening mechanism which will provide a relatively large force to move the opening mechanism only a part of the distance required to contact the seated ball valve member and a smaller force is then applied to the ball valve member capable of opening same after a substantial reduction in the pressure differential across the ball valve member.

Another object is to provide an opening mechanism for a ball type valve in which the line pressure controlled by the valve is directed against a pressure responsive member to at least assist in the opening of the valve in which the deleterious material, as for example sand, in the fluid flowing through the line is not likely to collect in sufficient quantity to interfere with the operation of the mechanism.

Other and further objects of this invention will appear as the description proceeds.

In the accompanying drawing, which forms a part of the instant specification, a vertical cross-sectional view of a valve embodying one form of the present invention is illustrated.

Referring to the drawing the valve is shown with a body 5 having a passageway 6 extending therethrough. A replaceable seat 7 is secured within the passageway for receiving the ball valve member 8. The seat may be suitably sealed within the passageway. The fitting 5a of the body is adapted to receive a suitable means for holding the ball valve member in an open position, which may be of the type shown in U.S. Patent 2,667,890 or U.S. Patent 2,834,371, or any other suitable mechanism. The exact form of such holding mechanism is not important to this invention, and in fact gravity alone may be employed for this purpose, as illustrated in FIG. 3 of U.S. Patent 2,667,890.

The mechanism for opening the valve is shown mounted in an opening or fitting 5b of the body. A bushing 36 is mounted in the valve by insertion through opening 5a until it seats on the flange 5c of the body. The housing 37 is connected to bushing 10 and clamps flange 5c to secure the assembly in place. A retractable stem mechanism which in this form includes plunger 42 extending through bushing 10 and into bushing 11 has one end secured by a slot mechanism to the inner end of stem link 43. The slotted end of plunger 42 has at least one open side to receive the flanged end of stem link 43.

A bypass passage 5d, in the body, is adapted to bypass the seated ball valve 8 to place passageway 6, on each side of the seat 7, in communication when the valve head 42a which is integrally attached to the plunger is moved toward the seated ball valve. The seals 39, 40 and 41, isolate the bypass from the exterior of the valve.

The sides of plunger 42 adjacent to valve head 42a may have flats formed thereon to provide a bypass passageway of sufficient cross-sectional area to accommodate the flow of line fluid between the shank and the cylindrical opening in the end of bushing 36 in which this portion of the plunger is located.

The line pressure urges valve head 42a against the seat and to ensure that an excessive amount of force is not exerted against the ball during the valve opening operation, valve opening means are provided which exert a large magnitude force for initiating movement of the retractable stem mechanism in ball opening direction, which force is ineffective to do more than just start this action to the point that the bypass conduit is opened; then a smaller net force, in the ball opening direction, is provided which cannot exert sufficient force on the seated ball to damage either it or its seat. Housing 37 supports housing 38 of the pressure responsive means which provides these forces.

A power transmitting connection between plunger 42 and the pressure responsive means is provided by the stem link 43. This link has a head which extends into a slot formed in the outboard end of plunger 42 and a seal assembly 44 seals between the end of plunger 42 and the adjacent bore of bushing 36. A snap ring 45 holds the seal assembly in place. The diameter of the portion of the bore in housing 36, in which assembly 44 fits, is greater than the diameter of the area within the seat which is engaged by the valve head 42a to control the bypass conduit.

Seal assembly 46 and seal 47 isolate the line pressure provided by the plunger bore 42b from the exterior of the valve. A filter assembly which is not shown but which can be any suitable filter material such as felt, protects the upper end of passage 42b, snap ring 62 being shown to illustrate the position. The bore of housing 36, between seals 41 and seal assembly 44, is vented at 36c. With this arrangement of areas it is seen that the line pressure, with the valve head 42a seated, provides a net force opposing opening movement of the retractable stem mechanism, equal to line pressure acting against the area of link 43 extending through seal assembly 46, less the area of the annular face provided by the area of the outer seal of seal assembly 44, plus the area of the seat for the valve head 42a. When the valve head 42a is first unseated, this net force opposing opening movement is reduced because of the somewhat smaller diameter of seal 41 than the diameter of the seat for valve head 42a, which is due to clearance.

For opposing these forces and to provide for opening of the ball valve, the pressure responsive mechanism is included having a power transmitting connection with stem 43. The means providing the large magnitude force for unseating valve 42a includes a separate fluid operated motor having the large diameter pressure responsive member or diaphragm 48. The connection between this pressure responsive member and the retractable stem mechanism includes the plate 49, which has a means to limit the travel of the pressure responsive member to just sufficient to unseat valve head 42a and open the bypass but insufficient to cause unseating of the ball valve and preferably even engagement of the plunger with the ball valve. A washer 50 may serve this purpose. Pressure fluid is supplied to the diaphragm through conduit 51 and due the area of the diaphragm this pressure may be relatively low pressure such as instrument air.

Obviously, when the washer 50 engages the diaphragm housing it limits the throw of the retractable stem 42 but a means is provided for then imposing a lesser force on stem 42 which will be sufficient to unseat the ball valve when the pressure drop thereacross has been sufficiently reduced. This lesser force imposed on stem 42 is insufficient to damage the ball valve or its seat. A second pressure responsive motor is employed for this purpose, which may utilize a piston 52 connected between stem 42 and the pin of plate 49. This latter connection is separable so that under influence of pressure fluid supplied by conduit 53, piston 52 may move the retractable stem in the direction to open the valve.

In operation, with the valve 42a seated, the greatest force is required to move the stem 42 to unseat it. The large diameter motor is capable of supplying this force until the washer 50 engages the diaphragm housing, thus rendering this portion of the pressure responsive means ineffective to produce further movement. However, this amount of motion has unseated valve head 42a, opening the bypass to reduce the pressure differential across the seated ball, and the bypass passage need not be restricted. Also, unseating of valve 42a has reduced the net force due to the line pressure urging the retractable stem mechanism in a direction to seat the valve member 42a. Thus, the force due to pressure acting against piston 52 is able to supply a net force urging the stem 42 into contact with the seated ball of sufficient strength to unseat the ball when the pressure differential thereacross has been sufficiently reduced; however, the force on the ball is insufficient to cause any damage to the seating surface of the ball or of the seat therefor.

In the foregoing specification the term "fluid" is used in its broadest sense as including both pneumatic and hydraulic fluids.

It will be seen that the ends and objects of the invention have been accomplished. The construction is such that a bypass is automatically provided upon initial actuation of the ball opening mechanism to reduce the pressure differential across the ball and the net force available for unseating the ball is restricted to reduce the likelihood of accidental damage to the seating surfaces of the ball and its seat member. The invention may be remotely or automatically controlled with the net force, exerted on the ball reduced due to the partial balancing of the effect of line pressure against the plunger, against the force available from the pressure responsive opening means, so as to reduce the likelihood of damaging the ball and its seat.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawing is to be interpreted as illustrative and not in a limiting sense.

We claim:

A valve comprising a body provided with a flow passage; a valve seat in the passage; a ball for engaging the valve seat and closing the passage, said ball being movable to a position to the side of the passage away from the seat to open the valve; a by-pass conduit communicating with the flow passage on both sides of the seat; a valve seat in the by-pass; a reciprocating plunger extending through the seat in the by-pass and exteriorly of the body of the valve, said plunger having a retracted position and an extended valve-opening position; sealing means in the by-pass sealing between the plunger and the body, the effective area encompassed by the sealing means being the area against which pressure in the by-pass acts to urge the plunger to its retracted position; a valve member carried by the plunger to engage the seat in the by-pass and close the by-pass when the plunger is in its retracted position to prevent line pressure from entering the by-pass and exerting a force on the effective area of the plunger, the effective area of the plunger encompassed by the sealing means being smaller than the area of the seat in the by-pass to provide a reduction in the force exerted by line pressure on the plunger opposing its movement to its extended or valve-opening position when the valve member moves away from the seat in the by-pass and opens the by-pass; a cylinder mounted on the body through which the plunger extends, said plunger including a piston reciprocally mounted in the cylinder; a passageway in the plunger connecting line pressure in the valve body to the cylinder to exert a force on the piston urging the plunger toward its extended valve-opening position, the area of the piston being less than the effective area of the plunger encompassed by the sealing means to provide a force on the plunger tending to lessen the force required to open the by-pass and move the plunger toward its extended position; and pressure-operated means for moving the plunger to its extended position, comprising a first fluid-operated motor having a pressure responsive member capable of exerting sufficient force on the plunger to move the valve member from the seat in the by-pass and open the by-pass, thereby reducing the force exerted on the plunger by line pressure, the travel of the pressure responsive member being sufficient to open the by-pass but less than that required to move the plunger into engagement with the ball, and a second fluid-operated motor having a pressure responsive member for exerting a force on the plunger sufficient to move the plunger toward its extended valve-opening position against line pressure when the by-pass is open but which is not sufficient to move the ball from the seat and open the valve until the pressure drop across the ball has been substantially reduced by the open by-pass.

References Cited in the file of this patent

UNITED STATES PATENTS

| 679,687 | Simpson | July 30, 1901 |
| 1,754,250 | Wright | Apr. 15, 1930 |
| 1,772,406 | Whiton | Aug. 5, 1930 |
| 2,897,836 | Peters | Aug. 4, 1959 |

FOREIGN PATENTS

| 682,049 | Germany | Sept. 14, 1939 |